T. ZIMMERMAN.
DYNAMO ELECTRIC MACHINE.
APPLICATION FILED NOV. 12, 1915.
1,353,883.
Patented Sept. 28, 1920.
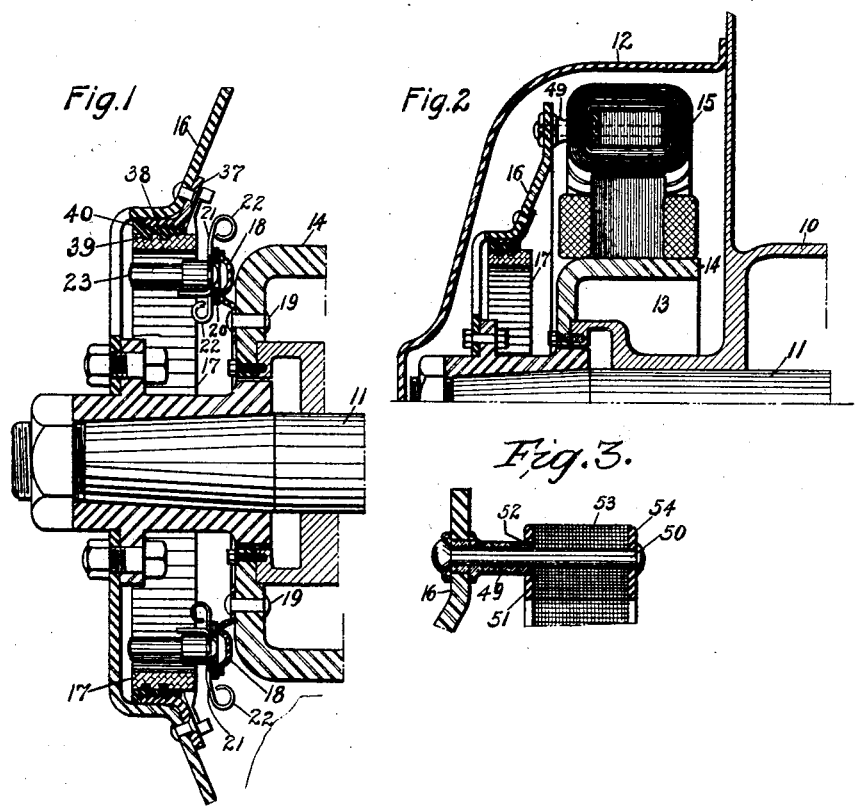
Witnesses
Eugénie Le Roux
Ralph Munden
Inventor
Thomas Zimmerman
By Raymond H. Van Vliet
Attorney

UNITED STATES PATENT OFFICE.

THOMAS ZIMMERMAN, OF NIAGARA FALLS, NEW YORK, ASSIGNOR TO U. S. LIGHT & HEAT CORPORATION, OF NIAGARA FALLS, NEW YORK, A CORPORATION OF NEW YORK.

DYNAMO-ELECTRIC MACHINE.

1,353,883.   Specification of Letters Patent.   Patented Sept. 28, 1920.

Application filed November 12, 1915. Serial No. 61,060.

*To all whom it may concern:*

Be it known that I, THOMAS ZIMMERMAN, a citizen of the United States, residing at Niagara Falls, in the county of Niagara and State of New York, have invented new and useful Improvements in Dynamo-Electric Machines, of which the following is a specification.

My invention relates to dynamo-electric machines and has particular reference to the mechanical arrangement of the parts, together with novel means for connecting the parts in operative relation.

An object is to provide means for fastening the armature laminations to their supporting members to overcome disastrous shearing stresses due to high speed.

Another object is to combine the parts in a compact structure, combining accessibility and strength.

Other objects will be apparent from the description which follows:

Referring to the accompanying drawings which illustrate one embodiment of my invention—

Figure 1 is a fragmentary view, partly in section, of the commutator end of a dynamo-electric machine.

Fig. 2 is a view illustrating the connections of the dynamo-electric machine with an internal combustion motor.

Fig. 3 is a view illustrating more clearly a feature illustrated in Fig. 2.

Referring first to Fig. 2, 10 indicates the casing of an internal combustion motor having a shaft 11. Secured by any suitable means to the casing 10 is a cover 12 inclosing the dynamo-electric machine which is indicated as a whole by the numeral 13. The dynamo-electric machine has a supporting structure 14 rigidly secured to the casing 10. This supporting structure 14 serves as a mounting and field frame for the field poles and field windings of the dynamo-electric machine.

Mounted outside of the field structure is the rotatable armature structure indicated as a whole by the numeral 15. Supporting the laminations and coils of the armature is an armature mounting frame or disk 16, preferably of steel, which is securely fastened in any suitable way to the shaft 11. Mounted within said disk 16, in a manner which will presently be described, is the commutator 17.

The brush rig supports 18 are mounted upon the structure 14 by any suitable means, as by rivets 19. Mounted on each support 18 and riveted thereto is the insulating plate 20 and the brush holder stud support 21.

As shown in Figs. 1 and 2, the commutator 17 is mounted in the frame 16. Riveted to the frame 16 is the ring 37 provided with a plurality of circumferential notches 38. The outside surface of the commutator structure is also provided with a plurality of notches 39. Between the commutator and the ring 37 is a molded ring 40 of a substance having the property of hardening under the action of heat and pressure, as for instance bakelite. The ring 40 serves to securely lock the commutator against movement. Inasmuch as the forces due to high speed are directed outwardly, the circumferential notch and tooth arrangement illustrated forms a very efficient holding means.

In a machine of this sort in which the outer member revolves, special precautions must be taken to avoid trouble due to the inertia of the revolving member. To this end I have provided the construction which will now be described. The steel frame has riveted thereto a plurality of distance pieces 49, of brass or other suitable non-magnetic material. Each distance piece 49 is provided with a hole to receive a steel rivet 50. These rivets are designed to carry a steel annulus 51 provided with a number of counterbores 52 extending part way therethrough to correspond to and receive the ends of the distance pieces 49, as shown in Fig. 3. The rivets 50 also carry the laminations 53 and the annulus 54. The distance pieces being of non-magnetic material, serve to break the magnetic circuit which would otherwise be formed through the frame 16. By this expedient, steel may be used in the construction of said frame, resulting in increased strength. The construction illustrated, having the distance pieces 49 located in the counterbores in the annulus 51, takes part of the shearing stresses off of the rivets 50.

The various features described above combine to produce a dynamo-electric machine particularly adapted for starting and lighting purposes, in combination with an internal combustion motor, inasmuch as the revolving armature may serve as the fly-wheel of the motor. The parts are so designed and arranged that the bad effects, due to high speed, are minimized, and at the same time, the machine is easy to assemble, inspect and repair.

The embodiment of my invention described herein has been selected merely for the purpose of illustration, and it is to be understood that the invention covers all equivalent means for accomplishing the desired results, so long as such means fall within the scope of the appended claims.

What I claim as new and desire to secure by Letters Patent of the United States is:—

1. In a dynamo-electric machine, a laminated armature core, rings arranged on either side of said core, rivets extending through said rings and core, one of said rings being counterbored at the rivet holes on the outside surface, and a supporting plate provided with riveted bushings of non-magnetic material corresponding in number and location to said rivets, said bushings carrying said rivets and fitting into said counterbored portions for the purpose set forth.

2. In a dynamo-electric machine, in combination, a laminated armature core, an end plate, a supporting bar extending through said core and end plate and a bushing mounted on said bar, said bushing extending part way but not entirely through said end plate.

3. In a dynamo-electric machine, in combination, a mounting frame member, a supporting bar carried thereby, a laminated core carried by said bar, said core having an end plate, a bushing member carried by said bar, said bushing member being mounted in said frame member and extending part way but not entirely through said end plate.

4. In a dynamo-electric machine, in combination, a mounting frame member, a supporting bar carried thereby, a laminated core carried by said bar, said core having an end plate, a bushing member carried by said bar, said bushing member being mounted in said frame member and extending part way but not entirely through said end plate, one of said members being of non-magnetic material.

5. In a dynamo-electric machine, in combination, a mounting frame, a bushing riveted therein and extending transversely thereto, a supporting bar extending through said bushing, a laminated core mounted on said bar, said core having an end plate on the side next said frame, said end plate being counter-bored and said bushing extending into said counter-bore.

In witness whereof, I have hereunto subscribed my name.

THOMAS ZIMMERMAN.